US010360657B2

(12) United States Patent
Cudak et al.

(10) Patent No.: US 10,360,657 B2
(45) Date of Patent: *Jul. 23, 2019

(54) SCALING CONTENT OF TOUCH-BASED SYSTEMS

(71) Applicant: International Business Machines Corporation, Armonk, NY (US)

(72) Inventors: Gary D. Cudak, Research Triangle Park, NC (US); Lydia M. Do, Research Triangle Park, NC (US); Christopher J. Hardee, Research Triangle Park, NC (US); Adam Roberts, Research Triangle Park, NC (US)

(73) Assignee: International Business Machines Corporations, Armock, NY (US)

( * ) Notice: Subject to any disclaimer, the term of this patent is extended or adjusted under 35 U.S.C. 154(b) by 969 days.

This patent is subject to a terminal disclaimer.

(21) Appl. No.: 14/305,591

(22) Filed: Jun. 16, 2014

(65) Prior Publication Data
US 2015/0363908 A1    Dec. 17, 2015

(51) Int. Cl.
*G06F 3/00* (2006.01)
*G06T 3/40* (2006.01)
(Continued)

(52) U.S. Cl.
CPC ............ *G06T 3/40* (2013.01); *G06F 3/04842* (2013.01); *G06F 3/04845* (2013.01); *G06F 3/04883* (2013.01); *G06F 2203/04806* (2013.01)

(58) Field of Classification Search
CPC ............ G06F 3/04842; G06F 3/04845; G06F 3/04883; G06F 3/048; G06F 2203/04806; G06T 3/40
See application file for complete search history.

(56) References Cited

U.S. PATENT DOCUMENTS 5,717,939 A * 2/1998 Bricklin ................ G06F 17/211
345/173
5,754,873 A     5/1998 Nolan
(Continued)

FOREIGN PATENT DOCUMENTS

EP      1632874 A2    3/2006

OTHER PUBLICATIONS

Office Action for U.S. Appl. No. 14/643,908, dated Jan. 3, 2017, 12 pages.
(Continued)

*Primary Examiner* — Mahelet Shiberou
(74) *Attorney, Agent, or Firm* — Jordan IP Law, LLC

(57) ABSTRACT

Methods and systems may provide for detecting a manual addition of first content to an interactive display and defining a content boundary around the first content. Additionally, a first automatic rescaling of the first content within the content boundary may be conducted in response to one or more of a manual modification of the first content or a trigger related to a characteristic of the first content. In one example, a manual reposition request is detected with respect to the first content, the first content is moved to a new position on the interactive display based on the reposition request, and a second automatic rescaling of the first content is conducted based on a state of second content that is adjacent to the new position.

12 Claims, 4 Drawing Sheets

(51) Int. Cl.
*G06F 3/0484* (2013.01)
*G06F 3/0488* (2013.01)

(56) References Cited

U.S. PATENT DOCUMENTS

| | | | |
|---|---|---|---|
| 7,454,702 B2* | 11/2008 | Simmons | G06F 3/04883 715/263 |
| 7,721,187 B2 | 5/2010 | Yen | |
| 8,347,228 B1 | 1/2013 | Kates et al. | |
| 8,621,370 B2* | 12/2013 | Ito | G06F 3/0481 715/255 |
| 8,719,351 B2 | 5/2014 | Chen et al. | |
| 9,020,825 B1* | 4/2015 | Garber | G06F 3/167 704/231 |
| 2002/0089549 A1* | 7/2002 | Munro | G06F 3/0481 715/835 |
| 2005/0041865 A1* | 2/2005 | Zhen | G06K 9/3283 382/187 |
| 2006/0103667 A1* | 5/2006 | Amit | G06F 17/211 345/619 |
| 2007/0083826 A1* | 4/2007 | Pessetto | G06F 17/50 715/800 |
| 2009/0300542 A1 | 12/2009 | Duarte et al. | |
| 2010/0007617 A1 | 1/2010 | Tsai | |
| 2010/0062811 A1* | 3/2010 | Park | G06F 3/0482 455/566 |
| 2010/0302176 A1 | 12/2010 | Nikula et al. | |
| 2011/0113323 A1 | 5/2011 | Fillion et al. | |
| 2012/0026100 A1* | 2/2012 | Migos | G06F 3/04883 345/173 |
| 2012/0194559 A1 | 8/2012 | Lim | |
| 2012/0284595 A1* | 11/2012 | Lyons | G06F 17/211 715/202 |
| 2012/0311422 A1* | 12/2012 | Weeldreyer | G06F 3/0488 715/220 |
| 2013/0305187 A1 | 11/2013 | Phillips et al. | |
| 2014/0056523 A1* | 2/2014 | Na | G06F 3/041 382/185 |
| 2014/0082530 A1 | 3/2014 | De Oliveira et al. | |
| 2014/0109004 A1* | 4/2014 | Sadhvani | G06F 3/0482 715/810 |
| 2014/0101588 A1 | 8/2014 | Chang et al. | |
| 2015/0186012 A1* | 7/2015 | Coleman | G06F 3/04842 715/752 |
| 2015/0207833 A1 | 7/2015 | Tsubotani et al. | |
| 2015/0286742 A1 | 10/2015 | Zhang et al. | |
| 2016/0041965 A1* | 2/2016 | Ghassabian | G06F 3/005 715/261 |

OTHER PUBLICATIONS

Panasonic, "Interactive Plasma Display: 65-inch TH-65PB1 Tentative", May 15, 2012, 2 pages, <http://www.panasonic.com/promos/infocomm/2012/downloads/2012NPI_TH65PB1U_us0524.pdf>.

Brian Heater, "Panasonic's interactive plasma display means never having to clean another eraser," May 15, 2012, 4 pages, <http://www.engadget.com/2012/05/15/panasonics-interactive-plasma-display-means-never-having-to-cle/>.

Final Office Action for U.S. Appl. No. 14/643,908, dated Jun. 20, 2017, 12 pages.

Non-Final Office Action for U.S. Appl. No. 14/643,908, dated Mar. 20, 2018, 33 pages.

Final Office Action for U.S. Appl. No. 14/643,908, dated Oct. 17, 2018, 33 pages.

Non-Final Office Action for U.S. Appl. No. 14/643,908, dated Apr. 5, 2019, 24 pages.

* cited by examiner

US 10,360,657 B2

SCALING CONTENT OF TOUCH-BASED SYSTEMS

BACKGROUND

Embodiments of the present invention generally relate to touch-based systems. More particularly, embodiments relate to scaling content on touch-based systems.

An interactive plasma display (IPD) is a touch-based system that may be used to replace chalkboards and/or whiteboards in educational, corporate and courtroom settings. A conventional IPD may provide for fast, simultaneous writing (e.g., by multiple individuals), as well as high image quality and pen identification. During a typical writing session, a user may decide the size and placement of content on the IPD, wherein poor planning or a change in circumstances may lead to the user running out of space on the IPD. Such a challenge may be particularly prevalent in impromptu settings (e.g., teaching environments) where the content is not predetermined.

BRIEF SUMMARY

Embodiments may also include a method of scaling content, comprising detecting a manual addition of first content to an interactive display, defining a content boundary around the first content, and conducting a first automatic rescaling of the first content within the content boundary in response to one or more of a manual modification of the first content or a trigger related to a characteristic of the first content.

Embodiments may also include a computer program product to scale content, the computer program product comprising a computer readable storage medium having program instructions embodied therewith, the program instructions executable by an interactive display to cause the interactive display to detect a manual addition of first content to the interactive display, define a content boundary around the first content, and conduct a first automatic rescaling of the first content within the content boundary in response to one or more of a manual modification of the first content or a trigger related to a characteristic of the first content.

Embodiments may include a computer program product to scale content, the computer program product comprising a computer readable storage medium having program instructions embodied therewith, the program instructions executable by an interactive display to cause the interactive display to detect a manual addition of first content to the interactive display, define a content boundary around the first content, wherein the interactive display has an interaction region and the content boundary is to occupy only a subset of the interaction region, conduct a first automatic rescaling of the first content within the content boundary in response to one or more of a manual modification of the first content or a trigger related to a first characteristic of the first content, detect a manual reposition request with respect to the first content, move the first content to a new position on the interactive display based on the manual reposition request, conduct a second automatic rescaling of the first content based on a state of second content that is adjacent to the new position, wherein the state is to include one or more of a classification or a size of the second content, detect a manual selection of an optimization boundary on the interactive display, identify a plurality of content regions within the optimization boundary, and automatically rescale the plurality of content regions independently of one another within the optimization boundary.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
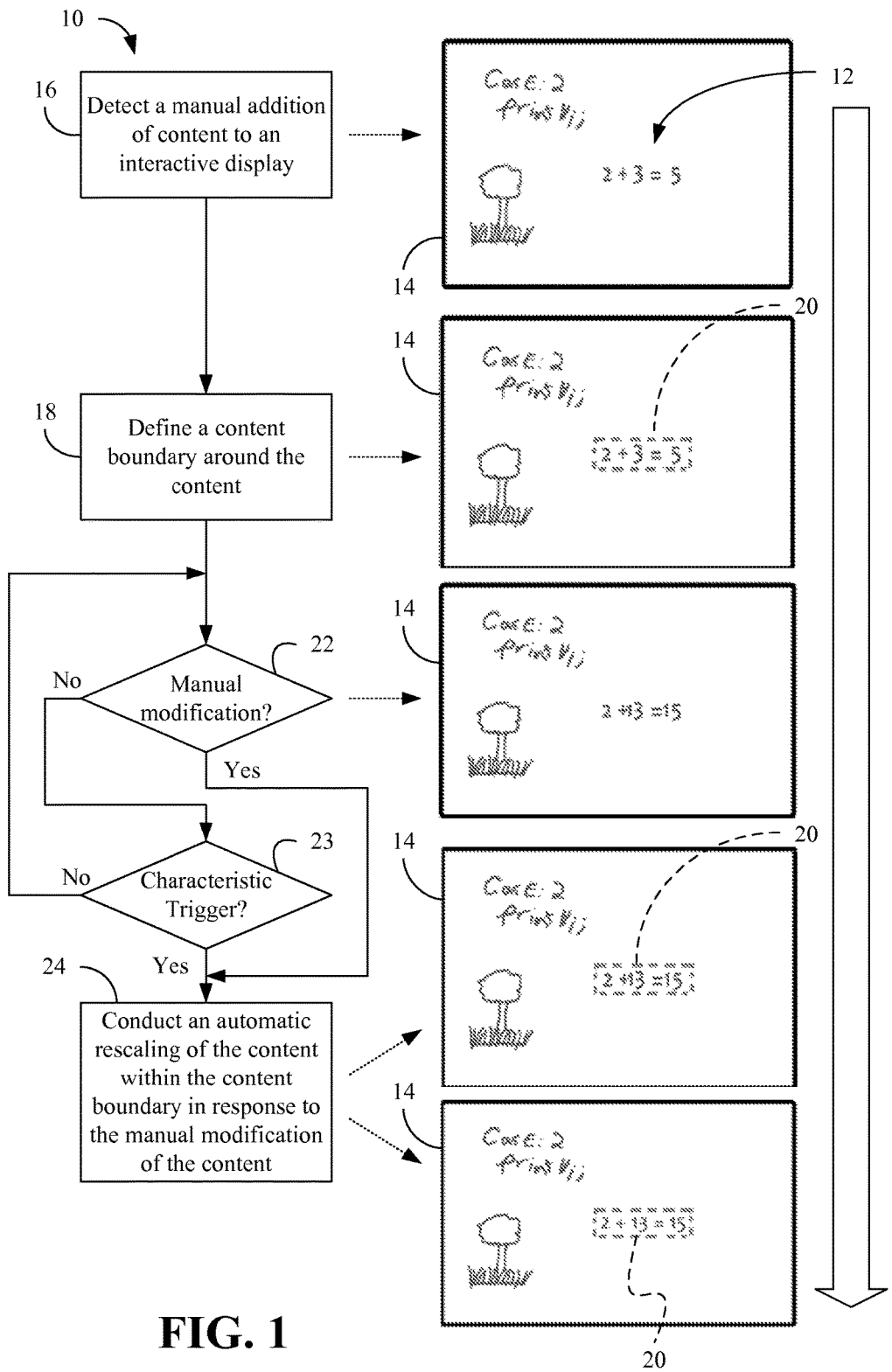
FIG. 1 is a flowchart of an example of a method of automatically rescaling content based on manual modifications to the content and characteristic triggers according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, a method 10 of automatically rescaling content based on manual additions to the content and characteristic triggers is shown. The method 10 may generally be conducted by the hardware and/or software of an interactive display 14 such as, for example, an interactive plasma display (IPD), tablet computer, touch-enabled smart phone, and so forth. In the illustrated example, the manual addition of content 12 to the interactive display 14 is detected at processing block 16. For example, the content 12 might be a mathematical formula (e.g., "2+3=5") written on an interaction region (e.g., the usable writing space) of the interactive display 14 by a user (e.g., instructor, presenter or other individual). Thus, the user may employ a pen, stylus, finger or other suitable item that is detectable by the interactive display 14 in order to manually add the content 12 to the interaction region.

Block 18 may provide for defining a content boundary 20 around the content 12. In the illustrated example, the content boundary 20 is a rectangle, although other boundary geometries may be used (e.g., parallelograms, circles, ovals, polygons). The illustrated content boundary 20, which occupies only a subset of the interaction region of the interactive display 14, may be made either visible or invisible to the user, depending on the circumstances (e.g., default settings, user preferences).

Block 18 may also include assigning a classification to the content 12 based on the type of content that has been added by the user. Thus, the available classifications might include formulas, illustrations, text, etc., or any combination thereof, wherein one or more natural language and/or object recognition techniques may be used to identify the type of content. A determination may be made at block 22 as to whether a manual modification (e.g., by the user) has been made to the content 12. Thus, the determination at block 22 may include, for example, detecting additional pen strokes within the content boundary 20 (e.g., placement of a "1" before the "3" and the "5" in the mathematical formula).

Illustrated block 24 provides for conducting an automatic rescaling of the content 12 within the content boundary 20 in response to the manual modification of the content 12. In the illustrated example, a one dimensional (1D) is conducted due to the type of content, wherein the 1D rescaling creates additional horizontal spacing in the mathematical formula without changing the vertical spacing of the mathematical formula. Of particular note is that blindly rescaling the content 12 in both dimensions according to an arbitrary aspect ratio may either prevent the content from being sufficiently widened in the horizontal dimension due to a lack of vertical space within the boundary 20 or result in more space being taken up by the content 12 due to a size increase of the content boundary 20 in the vertical direction. By selectively determining which dimension to scale, the illustrated example enables more efficient use of writing space, which may be limited as more and more content is added to the interaction region.

If no manual modification is detected at block 22, block 23 may determine whether a characteristic trigger has occurred. More particularly, block 23 may identify a characteristic of the content 12 such as, for example, the classification of the content 12, how long the content has been displayed on the interactive display 14, the download status of the content 12 (e.g., to local memory and/or disparate devices), the temporal relevance of the content 12 (e.g., relative to a daily class schedule), whether a user is speaking about the content 12 (e.g., based on speech recognition of audio data), whether the author of the content 12 is present, etc., or any combination thereof. Thus, the characteristic trigger may exist if the content 12 has been displayed for a certain amount of time, the content 12 has been downloaded to a backup drive/computer, and so forth. If the trigger is present, block 24 may conduct the automatic rescaling based on the underlying characteristic (e.g., shrink English content during math or vice versa).

Figure 2:
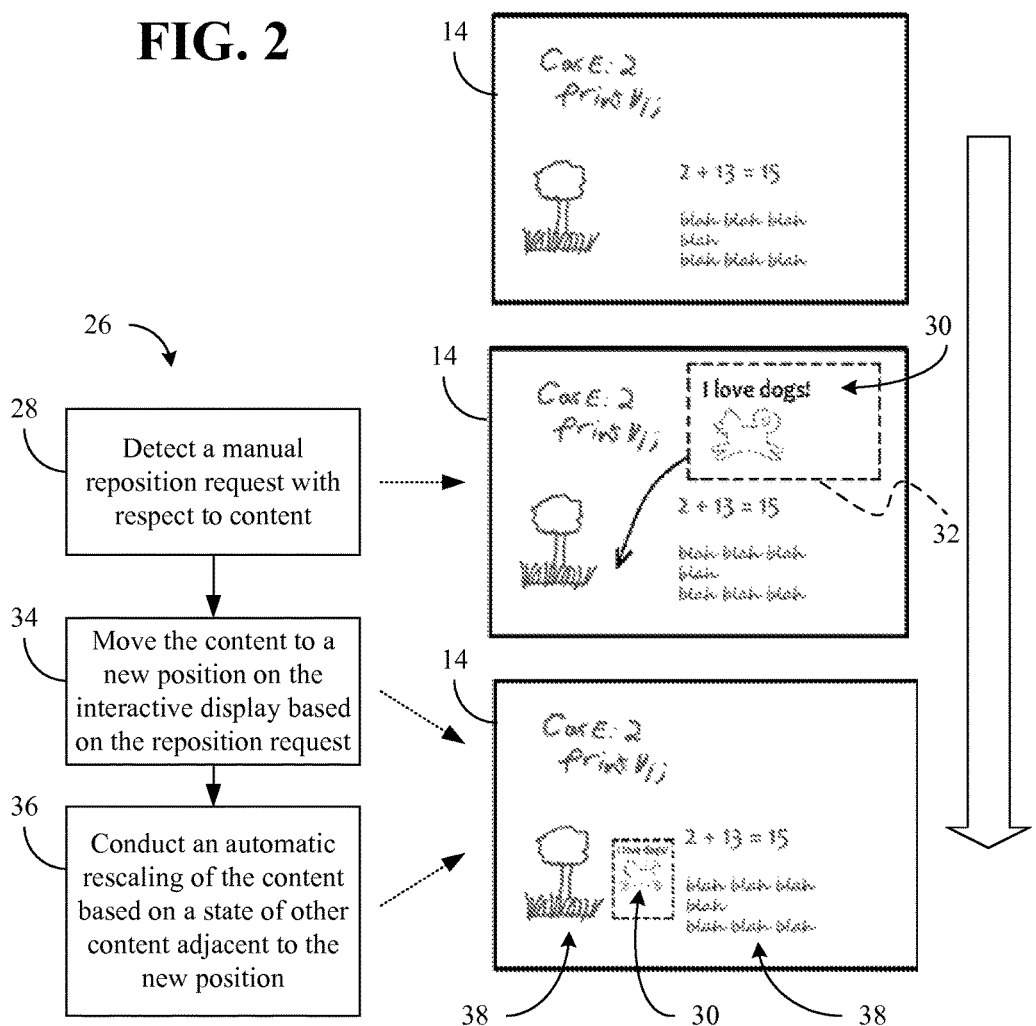
FIG. 2 is a flowchart of an example of a method of automatically rescaling content based on manual reposition requests according to an embodiment.

FIG. 2 shows a method 26 of automatically rescaling content based on manual reposition requests. The illustrated method 26, which may generally be conducted by the hardware and/or software of the interactive display 14, provides for detecting a manual reposition request with respect to content 30 at block 28. The manual reposition request may be made by the user dragging (e.g., with a pen or other detectable item) a content boundary 32, which may be automatically generated by the interactive display 14, or the content 30 itself from one position in the interaction region to a new position in the interaction region.

Accordingly, block 34 may move the content 30 to the new position on the interactive display 14 based on the reposition request, wherein an automatic rescaling of the content 30 may be conducted at block 36 based on the state of other content 38 adjacent to the new position. The state of the other content 38 may include, for example, the classification (e.g., formula, image, text), size, priority, display age, temporal relevance, etc., of the content 30, wherein the state of the other content 38 may be evaluated relative to similar state characteristics of the content 30 that is being moved. For example, it might be determined that due to the size of the other content 38, the new position permits a particular maximum size of the content 30 without rescaling the other content 38. If the other content 38 has a higher priority than the content 30 that is being moved, then block 36 may proportionately shrink the content 30 in the horizontal and vertical dimensions (e.g., conduct a two dimensional/2D rescaling) to fit within the available space. If, on the other hand, the other content 38 has a lower priority than the content 30 that is being moved, then block 36 might shrink the other content 38 to make room for the content 30 at its current size. In yet another example, block 36 may both shrink the content 30 and enlarge the other content 38 depending on the relative priorities or other content characteristics.

Figure 3:
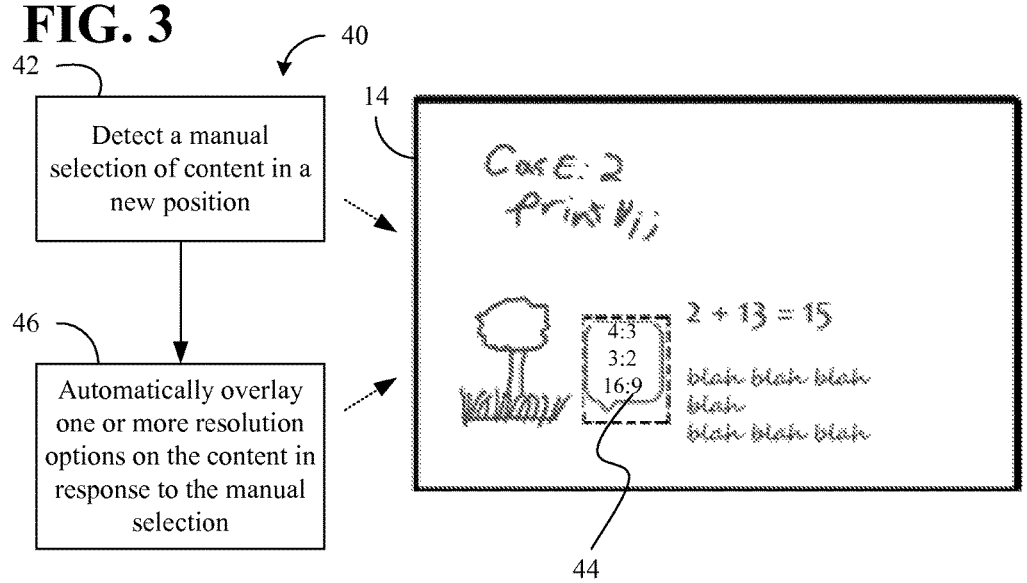
FIG. 3 is a flowchart of an example of a method of automatically overlaying resolution options on content according to an embodiment.

Turning now to FIG. 3, a method 40 of automatically overlaying resolution options on content is shown. The illustrated method 40, which may generally be conducted by the hardware and/or software of the interactive display 14, provides for detecting a manual selection of content that has been moved to a new position at block 42. The manual selection may be made, for example, by the user touching the moved content with a pen or other detectable item. One or more resolution options 44 may be overlaid on the content at block 46 in response to the manual selection. In the illustrated example, the user is able to select from the aspect ratios of 4:3, 3:2 and 16:9, wherein the selected aspect ratios may be used to rescale the moved content.

Figure 4:
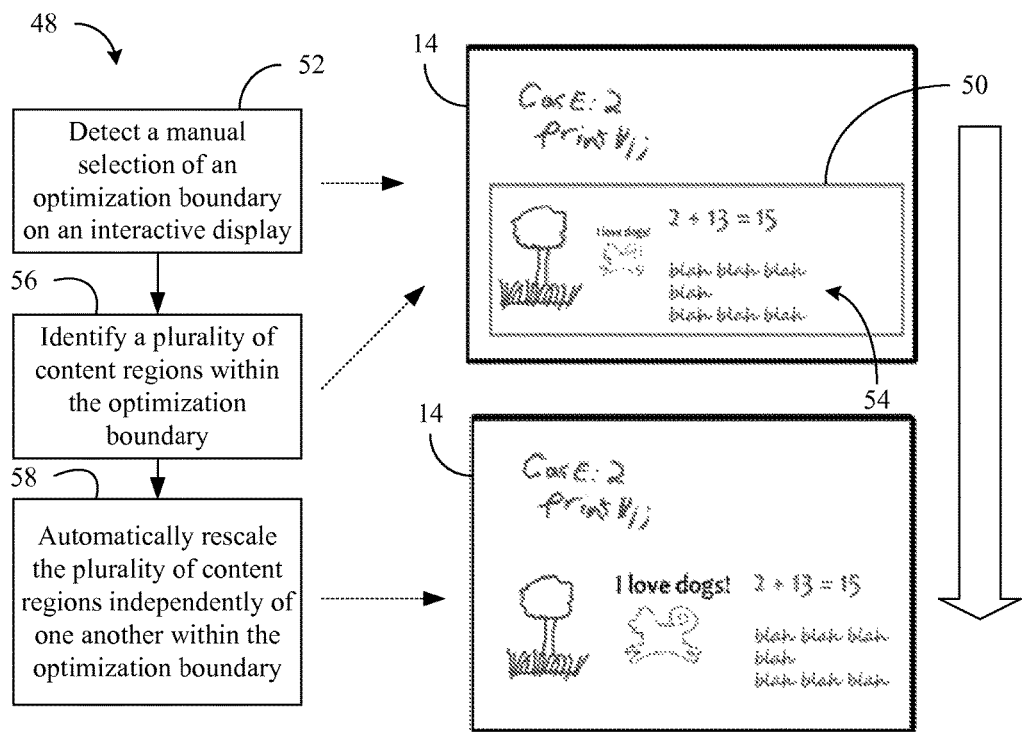
FIG. 4 is a flowchart of an example of a method of automatically rescaling a plurality of content regions according to an embodiment.

FIG. 4 shows a method 48 of automatically rescaling a plurality of content regions. The illustrated method 48, which may generally be conducted by the hardware and/or software of the interactive display 14, provides for detecting a manual selection of an optimization boundary 50 at block 52. The manual selection may be made, for example, by the user drawing the optimization boundary 50 around a plurality of content regions 54 (e.g., tree illustration, dog illustration, mathematical formula, handwritten text) on the interactive display 14. Illustrated block 56 identifies the plurality of content regions 54, wherein the plurality of content regions 54 may be rescaled independently of one another within the optimization boundary 50 at block 58. In the illustrated example, the mathematical formula and the handwritten text are shifted to the right without being rescaled, the tree illustration is kept stationary without being rescaled, and the dog illustration is enlarged in the extra space created by the other adjustments. Moreover, the handwritten text outside the optimization boundary 50 is unaffected in the illustrated example.

Figure 5:
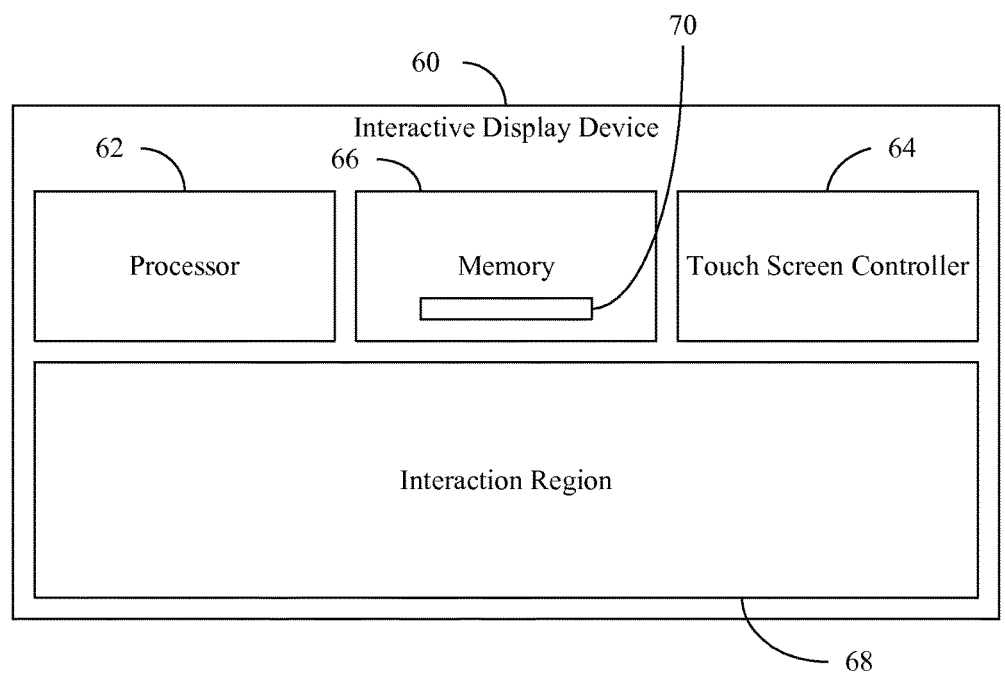
FIG. 5 is a flowchart of an example of an interactive display device according to an embodiment.

FIG. 5 shows an interactive display device 60 that may be readily substituted for the interactive display 14 (FIGS. 1-4), already discussed. The interactive display device 60 may be an IPD, tablet computer, touch-enabled smart phone, and so forth. In the illustrated example, the device 60 includes a processor 62, a touch screen controller 64, memory 66 (e.g., read only memory/ROM, random access memory/RAM, flash memory, or other suitable computer readable storage medium) and an interaction region 68. The memory 66 may have program instructions 70 embodied therewith, wherein the program instructions 70 are executable by the processor 62 and/or touch screen controller 64 to perform any of the methods depicted in FIGS. 1-4. Thus, for example, execution of the instructions 70 may cause the interactive display device 60 to detect a manual addition of first content to the interaction region 68, define content a content boundary around the first content, assign a first classification to the first content, and conduct a first automatic rescaling of the first content within the content boundary in response to one or more of a manual modification of the first content or a trigger related to a characteristic of the first content.

Execution of the instructions 70 may also cause the interactive display device 60 to detect a manual reposition request with respect to the first content, move the first content to a new position in the interaction region based on the manual reposition request, and conduct a second automatic rescaling of the first content based on a state of second content that is adjacent to the new position, wherein the state is to include one or more of a second classification or a size of the second content. Other functions such as, for example, optimizations and the overlay of resolution options may also be implemented via the instructions 70. Alternatively, one or more aspects of the instructions 70 may be implemented as circuitry (e.g., embedded logic).

Techniques described herein may therefore enhance the operation of touch-based systems by automatically rescaling content created by a user. The techniques may be particularly useful in impromptu settings such as teaching environments in which the content is not predetermined.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product to scale content, the computer program product comprising a computer readable storage medium having program instructions embodied therewith, the program instructions executable by an interactive display to cause the interactive display to:
   detect a manual addition of first content to the interactive display;
   define a content boundary around the first content, wherein the interactive display has an interaction region and the content boundary is to occupy only a subset of the interaction region;
   conduct a first automatic rescaling of the first content within the content boundary in response to a manual modification of the first content that includes an addition to the first content, wherein the first automatic rescaling of the first content determines which of two available dimensions is to be rescaled;
   detect a manual reposition request with respect to the first content;
   move the first content to a new position on the interactive display based on the manual reposition request;
   conduct a second automatic rescaling of the first content based on a state of second content that is adjacent to the new position, wherein the state is to include a classification of the second content;
   detect a manual selection of an optimization boundary on the interactive display;
   identify a plurality of content regions within the optimization boundary; and
   automatically rescale the plurality of content regions independently of one another within the optimization boundary without occluding any of the content regions.

2. The computer program product of claim 1, wherein the program instructions are executable by the interactive display to cause the interactive display to:
   detect a manual selection of the first content in the new position; and
   automatically overlay one or more resolution options on the first content in response to the manual selection.

3. The computer program product of claim 1, wherein the program instructions are executable by the interactive display to cause the interactive display to:
   conduct the first automatic rescaling of the first content within the content boundary in response to a trigger related to a characteristic of the first content,
   wherein the characteristic is to include one or more of a download status of the first content, whether a user is speaking about the first content, or whether an author of the first content is present.

4. The computer program product of claim 1, wherein the first automatic rescaling is to be a one dimensional (1D) rescaling.

5. A computer program product to scale content, the computer program product comprising a computer readable storage medium having program instructions embodied therewith, the program instructions executable by an interactive display to cause the interactive display to:
   detect a manual addition of first content to the interactive display;
   define a content boundary around the first content; and
   conduct a first automatic rescaling of the first content within the content boundary in response to a manual modification of the first content that includes an addition to the first content without occluding a second content, wherein the first automatic rescaling of the first content determines which of two available dimensions is to be rescaled.

6. The computer program product of claim 5, wherein the program instructions are executable by the interactive display to cause the interactive display to:
   detect a manual reposition request with respect to the first content;
   move the first content to a new position on the interactive display based on the manual reposition request; and
   conduct a second automatic rescaling of the first content based on a state of the second content, wherein the second content is adjacent to the new position.

7. The computer program product of claim 6, wherein the state is to include one or more of a classification or a size of the second content.

8. The computer program product of claim 6, wherein the program instructions are executable by the interactive display to cause the interactive display to:
   detect a manual selection of the first content in the new position; and
   automatically overlay one or more resolution options on the first content in response to the manual selection.

9. The computer program product of claim 5, wherein the program instructions are executable by the interactive display to cause the interactive display to:
   detect a manual selection of an optimization boundary on the interactive display;
   identify a plurality of content regions within the optimization boundary; and
   automatically rescale the plurality of content regions independently of one another within the optimization boundary.

10. The computer program product of claim 5, wherein the program instructions executable by an interactive display cause the interactive display to:
    conduct the first automatic rescaling of the first content within the content boundary in response to a trigger related to a characteristic of the first content,
    wherein the characteristic is to include one or more of a download status of the first content, whether a user is speaking about the first content, or whether an author of the first content is present.

11. The computer program product of claim 5, wherein the first automatic rescaling is to be a one dimensional (1D) rescaling.

12. The computer program product of claim 5, wherein the interactive display has an interaction region and the content boundary is to occupy only a subset of the interaction region.

* * * * *